United States Patent
Li

(10) Patent No.: US 7,565,520 B2
(45) Date of Patent: Jul. 21, 2009

(54) NAVIGATION SYSTEM AND METHOD WITH SWITCHABLE MULTI-LANGUAGE INTERFACES

(75) Inventor: Wei-Chung Li, Taiwan (TW)

(73) Assignee: Mitac International Corp, Taoyuan (TW)

(*) Notice: Subject to any disclaimer, the term of this patent is extended or adjusted under 35 U.S.C. 154(b) by 489 days.

(21) Appl. No.: 11/408,020

(22) Filed: Apr. 21, 2006

(65) Prior Publication Data

US 2006/0242202 A1 Oct. 26, 2006

(30) Foreign Application Priority Data

Apr. 22, 2005 (TW) .............................. 94112940 A

(51) Int. Cl.
*G06F 15/177* (2006.01)
(52) U.S. Cl. ................ 713/1; 713/2; 713/100
(58) Field of Classification Search ............. 713/1; 704/1, 8; 701/200, 208
See application file for complete search history.

(56) References Cited

U.S. PATENT DOCUMENTS

| | | | |
|---|---|---|---|
| 5,917,484 A * | 6/1999 | Mullaney | 715/703 |
| 6,243,675 B1 * | 6/2001 | Ito | 704/232 |
| 6,336,111 B1 * | 1/2002 | Ashby et al. | 707/4 |
| 6,611,708 B1 * | 8/2003 | Morgan et al. | 607/5 |
| 6,618,650 B1 * | 9/2003 | Nakai et al. | 701/1 |
| 6,985,562 B1 * | 1/2006 | Matsuda et al. | 379/88.06 |
| 6,989,770 B1 * | 1/2006 | Painter | 340/995.12 |
| 7,185,289 B1 * | 2/2007 | Taima | 715/810 |
| 7,277,846 B2 * | 10/2007 | Satoh | 704/3 |
| 7,340,389 B2 * | 3/2008 | Vargas | 704/8 |
| 7,464,334 B2 * | 12/2008 | Miller et al. | 715/700 |
| 2003/0046526 A1 * | 3/2003 | Zhang et al. | 713/1 |
| 2006/0242621 A1 * | 10/2006 | Ye et al. | 717/105 |
| 2007/0179773 A1 * | 8/2007 | Shibutani | 704/2 |

FOREIGN PATENT DOCUMENTS

| | | | |
|---|---|---|---|
| GB | 2384362 A | * | 7/2003 |
| JP | 11219105 A | * | 8/1999 |

\* cited by examiner

*Primary Examiner*—Nitin C Patel
(74) *Attorney, Agent, or Firm*—Morris Manning Martin LLP; Tim Tingkang Xia

(57) ABSTRACT

A navigation system and method that allows switching between multi-language operating interfaces. It provides multi-language operating interfaces in the storage unit of the navigation system. During the navigation system operation, the user is prompted by Basic Input Output System (BIOS) to select a language of operating interface to display. The navigation system is then installed by executing the index file of the selected language to display the navigation system operating interface in the selected language.

10 Claims, 4 Drawing Sheets

NAVIGATION SYSTEM AND METHOD WITH SWITCHABLE MULTI-LANGUAGE INTERFACES

CROSS-REFERENCE TO RELATED APPLICATIONS

This non-provisional application claims priority under 35 U.S.C. § 119(a) on Patent Application No(s). 94112940 filed in Taiwan, R.O.C. on Apr. 22, 2005, the entire contents of which are hereby incorporated by reference.

BACKGROUND OF THE INVENTION

1. Field of Invention

The present invention relates to a navigation system and related method thereof, and in particular to a navigation system and related method thereof for providing multi-language interfaces and audio prompts.

2. Related Art

The Global Position System (GPS) was invented by the United States and Russia during the Cold War and used mainly for military purposes such as aircraft guidance and missile targeting, etc. With an advance in civilian technologies, it also found use in business fields such as GPS-integrated electronic maps, which provide tracking and positioning functionalities. With the GPS installed, a car driver may know his exact position on the map and will not get lost.

The GPS uses signals transmitted through space from more than three satellites to compute the current position of a user. With this technique, the error of locating a computed user position is only 10 to 15 meters, no matter a user is on land, at sea or in the air. The precision is good enough for car guidance.

By installing the GPS navigation system in a car, the driver is able to find the shortest path and its total length to any destination. Driving speed is detected by the system and warnings are sent to the user when necessary. Amid the great number of competitions, in addition to improving signal reception, a GPS navigation system maker wins by either increasing details of maps, such as a description of sightseeing spots, number of famous landmarks, even position of speed radars and cameras, with frequent updates, or upgrading the system, such as music playback, digital photo viewing, personal organizer management, movie playback, etc.

In the past, the GPS navigation system stored all programs and maps data in its Read Only Memory (ROM), which is too limited to provide all these functionalities. Even with the installation of a Random Access Memory (RAM) in these GPS navigation systems, the capacity will not be large enough due to cost consideration. For economic reasons and to further expand storage, GPS navigation systems must provide built-in Micro-Drives or expansion card slots.

However, GPS navigation systems in the market are commonly built-in with an operating interface in one single language. For example, a GPS navigation system purchased in Taiwan is often built-in with a Chinese operating interface and audio prompt; a GPS navigation system purchased in Korea is often built-in with a Korean operating interface and audio prompt. Users who need to travel around the world often must purchase GPS navigation systems for the countries they are visiting. This may not be a problem in the United States, where English is the first language. However, in Europe, each country has its own language such as German, French, Spanish, Italian . . . , etc. It is very inconvenient if a GPS navigation system is built-in with an operating interface in one single language.

SUMMARY OF THE INVENTION

The above mentioned problems are addressed by the present invention. A main objective of the present invention is to provide a navigation system and related method thereof that allows switching between multi-language operating interfaces so that users don't need to purchase more than one GPS navigation system when visiting countries that use different languages; this is not only inconvenient, but a waste of money as well.

To achieve the above goal, a navigation system and related method thereof that allows switching between multi-language operating interfaces disclosed by the present invention includes a storage unit for storing installation programs and audio databases of multi-language operating interfaces in GPS navigation systems, a Basic Input Output System (BIOS) for actuating the navigation system during a boot up thereof and controlling to display a selection interface in a selected language, a setup module for receiving a language selection of a user from the selection interface, a memory module for storing the currently installed operating interface and temporary files generated while running navigation programs, an installation module for reading navigation system installation programs from the storage unit and installing them into the memory module, and a control module for receiving the user's command so as to perform a hot-swap while the navigation system program is operating.

During the navigation system cold boot, a user may select the desired language of the operating interface to display. First, when a navigation system is booted, the system configuration file is loaded from the storage unit into the BIOS and a language selection interface is displayed. Second, the installation program of the selected language by the user is loaded from the storage unit when a user makes his language selection of operating interface. Third, the installation program is executed and the operating interface of the selected language is installed into the memory module. Finally, the operating program is run by the selected language interface and displayed with the corresponding language font provided by the operating system.

Once the navigation system operating interface is installed by the BIOS, there is no need to make the language selection when warm booted. If language switching is required, a hot-swap is available in the system option setting. The desired language is loaded into the memory, and the initialization and peripheral driver loading time are needed when performing a cold boot. Performing a hot-swap includes the following steps: First, the user's language switch setting is accepted by the control module during the operation of the navigation system, and then the selected language setting is sent to the BIOS. Second, a first language operating interface previously installed is removed from the memory module, and then a program of a second language operating interface loaded from the storage unit is installed. Finally, the program of the operating interface program is run after its installation is complete, and the corresponding font provided by the operating system is then displayed.

The embodiment and features of the present invention will be more clearly understood by reference to the following description and drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus is not limitative of the present invention, wherein.

DETAILED DESCRIPTION OF THE INVENTION

A navigation system and method that allows switching between multi-language operating interfaces is disclosed by the present invention. Specific details will be described in the following to provide a complete description of the present invention. However, the specific details are not needed to implement the present invention, or alternative components or methods may be used by those skilled in the art, to implement the present invention. In other situations, well-known methods, processes, components and circuits are not elaborated.

Figure 1:
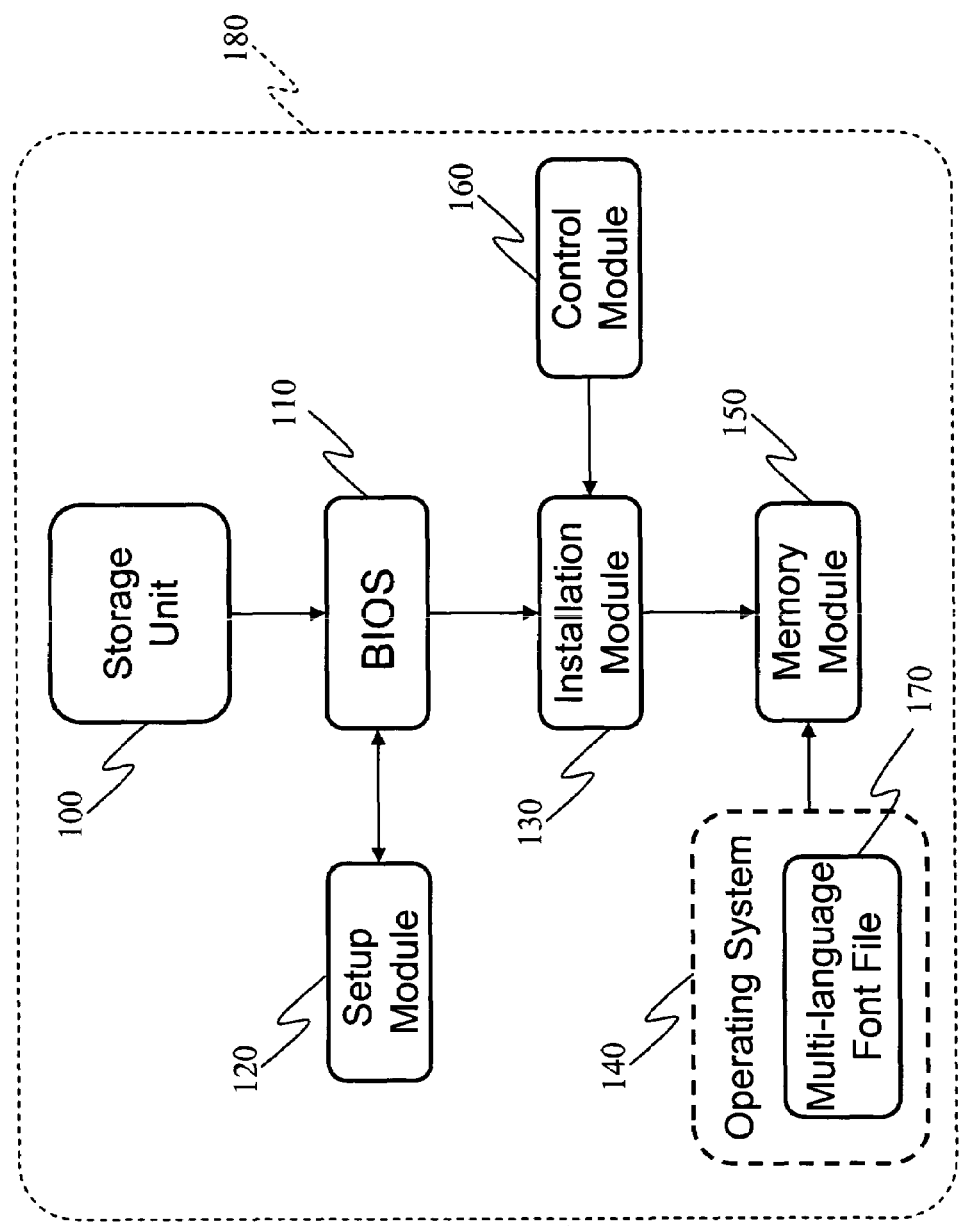
FIG. 1 is a system structure view of the present invention.

Referring to FIG. 1 of a system structure view of the present invention. The multi-language navigation system 180 disclosed by the present invention includes a storage unit 100, a BIOS 110, a setup module 120, an installation module 130, a memory module 150, and a control module 160.

The storage unit 100 stores the installation programs of the multi-language navigation system operating interfaces. With the increasing details of maps, the capacity of storage units 100 has to be expanded in accordance. It is enough to store map data in the Flash ROM inside navigation systems when there were only a few map data in the past. A drawback of storing map data in the Flash ROM is that map data updates are not convenient for users. Although installation and updates can be made by users when using the SDRAM or EDORAM as storage unit 100, electric energy is required to retain the data stored inside. If the batteries are empty, or the electric energy is lost, the data need to be re-installed. In addition, the price is still expensive. Further, the Flash ROM is not suitable as big capacity storage unit. The solution is either by a built-in hard disk (HD) of a navigation system with all the installation data pre-stored for users to install according to their needs, or an expansion card slot that can be expanded by adding NAND Type Flash Memory such as Smart Media (SM), a Secure Digital (SD), an Multi-Media Card (MMC), a Compact Flash (CF), an Memory Stick (MS), etc. By inserting a Memory Flash card with pre-stored map data into an expansion card slot, users can update data in navigation systems. No electric energy is required for both methods above and with an advance in technology, the same size will hold a bigger capacity, and the price becomes cheaper and cheaper.

The setup module 120 is a physical device, such as a keyboard, joystick, button, remote control, touch screen, etc., used to accept the user's inputs, such as the functionality switch by a function key, the multi-language selection by an arrow key, the switch interface language command, or the system warm boot setup by a power switch, etc.

The BIOS 110 is stored in a highly reliable, randomly accessible fast NOR Type Flash Memory (NorFlash) which records the firmwares that control the operations of the navigation system. It enables normal system operation by providing basic input/output functionalities that set up each component in the navigation system during the boot up. It also loads the system configuration file from storage unit 100, sets up the navigation system according to this configuration file and obtains the information of languages available for the operating interface installation programs during the boot up, and records the language setup made by the user through hot-swap while the navigation system is operating.

The memory module 150 is the destination device in which the operating interface of selected language is installed. It also stores the temporary files generated during the operation of the navigation system. The SRAM or DRAM is usually used for that faster read/write speed and rewritable ability is needed for system access compared to the NandFlash ROM used in storage unit 100 or the NorFlash ROM used in the basic I/O system. However, the problem of using the SRAM or DRAM is that the data will be lost when the system runs out of electricity. A common solution is to add a rechargeable battery to have a power back-up.

Figure 2:
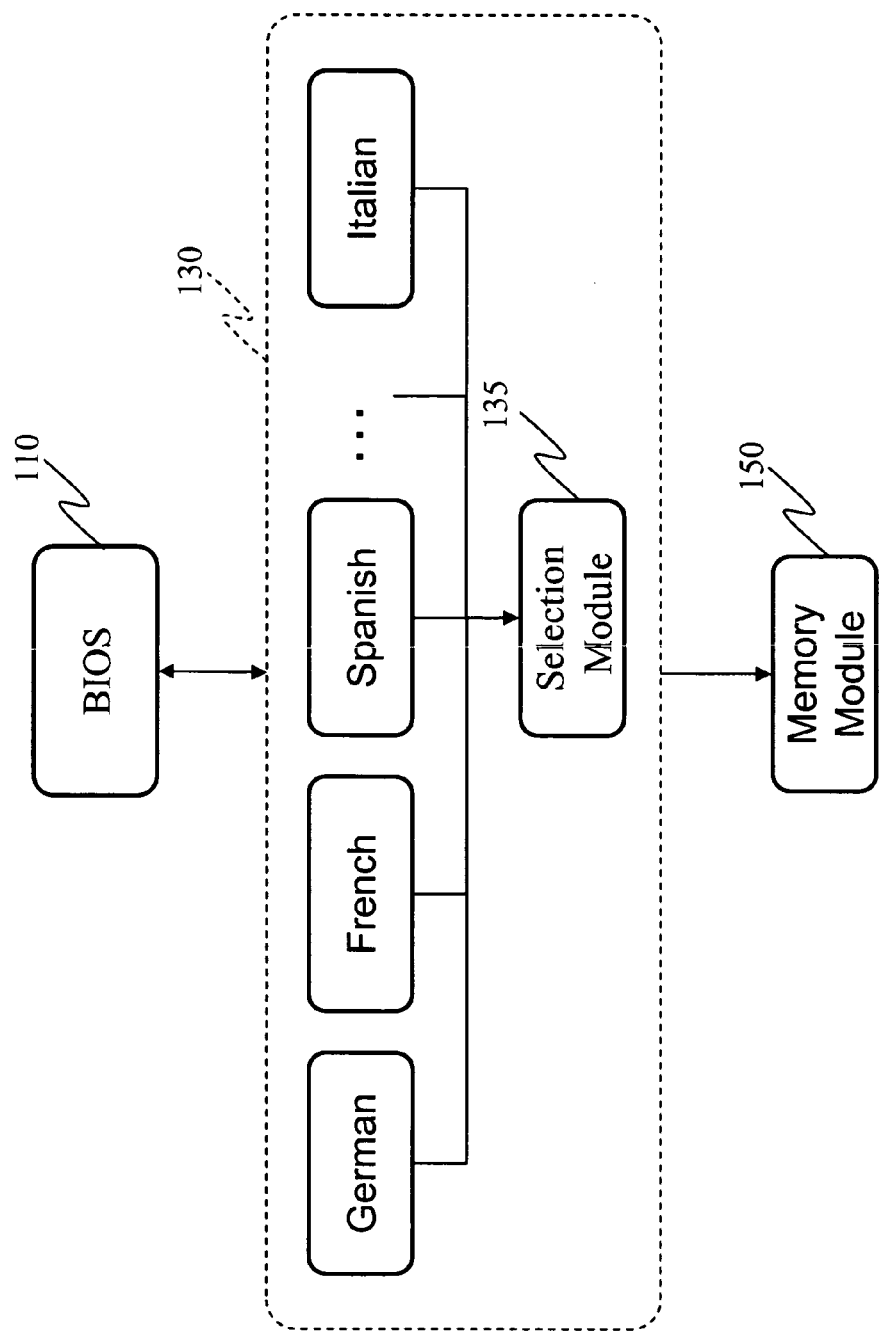
FIG. 2 is a detailed block diagram of the installation module of the present invention.

The installation module 130 reads the navigation system installation programs from the storage unit 100 and installs the multi-language operating interface to the memory module 150. It is stored in a built-in NandFlash RAM of the multi-language navigation system so that the data is retained even if the system runs out of electricity. Referring to FIG. 2, the installation module 130 accepts the input coming from either a user selection command in the BIOS 100 or a switch interface language command for hot-switch in the control module 160 during system operation; the selection module 135 decides which language index is used for installation and loads the data needed from the storage unit 100. It then combines the audio data according to the index file of each language during the system restart after the installation has been done.

The control module 160 accepts the switch interface language command to perform a hot-swap while the multi-language navigation system 180 is operating. There are two choices available if a user wants to switch to a different language when the multi-language navigation system 180 completes its boot-up and operates normally. The first choice is to cold boot the system. For example, detaching the battery or pressing the cold boot button. However, a drivers reloading and identification establishment is required for the whole system during a cold boot, and in particular concerning the restart of the Global Position System receiver and the identification establishment, with satellites to receive satellite signals. Continuous confirmation between the receiver and satellites is needed until the identification is established successfully, in order to get the correct position. The time needed for an identification to be established depends on the signal receiving efficiency at the user's position.

The second choice is to terminate the operation of the navigation system in the memory module 150 upon receiving the switch interface language command and then load and install the operating interface program in the selected language from the storage unit 100, by the installation module 130. The switching speed is faster than a cold boot: the identification of system hardware needs not to be re-established; the things needed to be done are only to remove the previously installed operating interface from the memory module 150 and then install the operating interface in the selected language.

Figure 3:
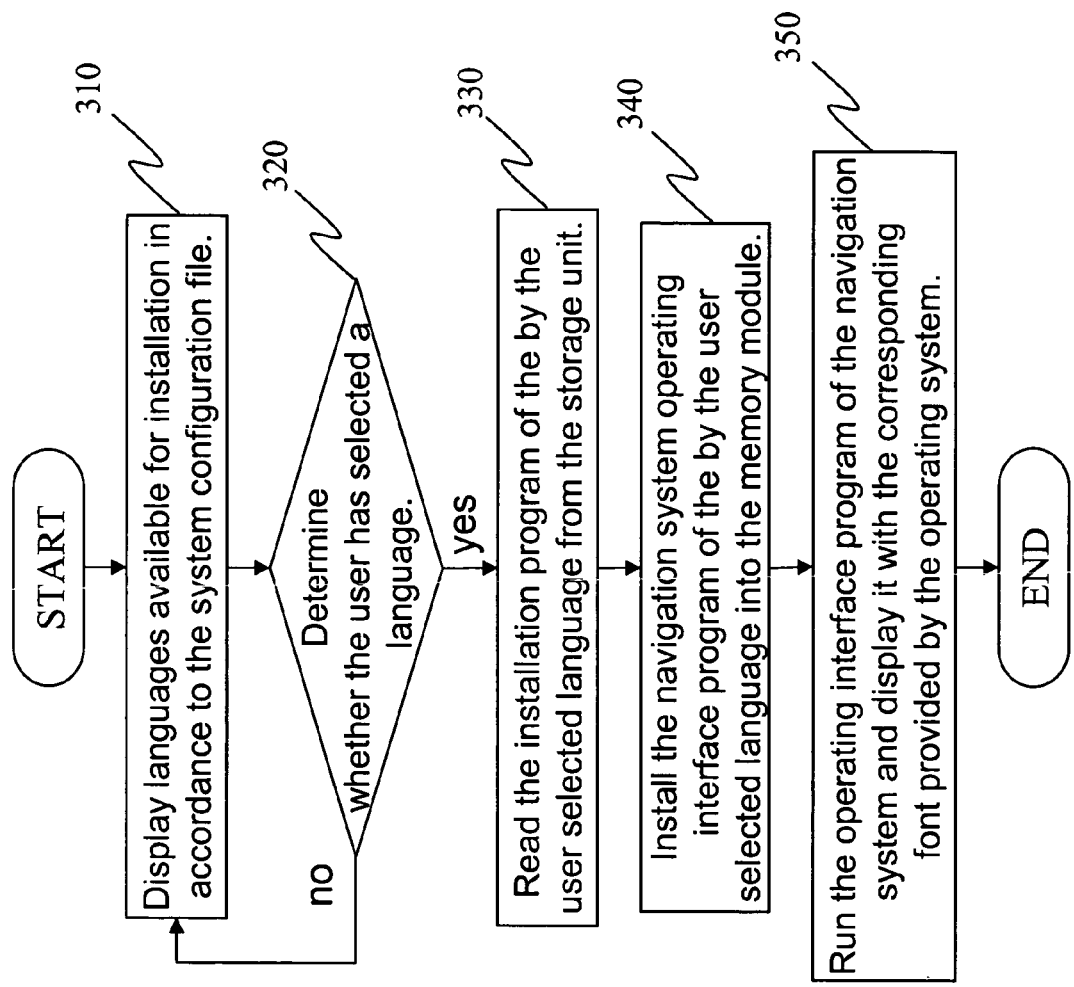
FIG. 3 is a flow chart depicting the setting process of the multi-language operating interfaces during a cold boot of the present invention.

Referring to FIG. 3 of a cold boot flow chart of the multi-language navigation system 180. First, after the multi-language navigation system 180 is booted up and operating, the system configuration file that specifies languages available for the operating interface installation programs can be loaded into the storage unit 100 and a view of available languages is displayed for users to select (step 310); second, when the user selects a desired operating interface language through the setup module 120 (step 320), the installation program is read from storage unit 100 by the BIOS 110 in accordance to the user's language selection (step 330).

After that, the installation module 130 installs the navigation system-operating interface in the selected language by running the installation program (step 340). Finally, the built-in multi-language font 170 insides the operating system 140 is used for the display of the operating interface in the selected language when the multi-language navigation system 180 operating (step 350). The selection module 135 loads and plays audio from the storage unit 100 in according to the language index files of each language when needed.

However, once the multi-language operating interface is installed by the BIOS 110, there is no need to make the language selection when being warm booted. If language switching is required, a hot-swap is available in the system option setting. The desired language is loaded into the memory module 150; the initialization and peripheral driver loading time needed when performing a cold boot is saved.

Figure 4:
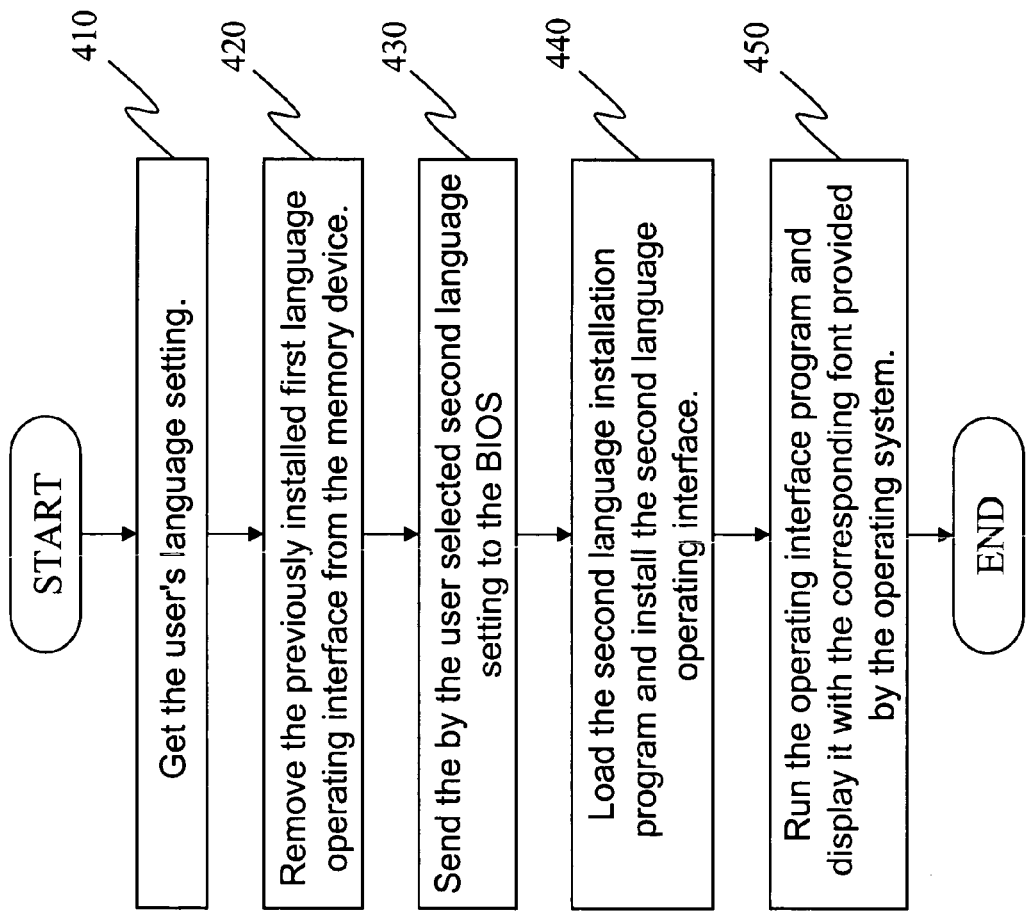
FIG. 4 is a flow chart depicting the setting process of the multi-language operating interfaces during a hot-swap of the present invention.

Referring to FIG. 4 of a flow chart of hot-swapping between multi-language operating interfaces. Performing a hot-swap includes the following steps: First, the user's language switch setting is accepted by the control module 160 during the multi-language navigation system 180 operation (step 410) and the selected language setting is sent to the BIOS 110. The operation of the navigation system needs to be terminated to avoid memory lock by the operating system 140. Second, the first language operating interface previously installed is removed from the memory module 150 (step 420). Then, the installation program of the second language operating interface is loaded by BIOS 110 in accordance to the user's selection setting received from the storage unit 100 (step 430) and the second language operating interface is installed into the memory module 150 (step 440). Finally, the multi-language navigation system 180 is restarted once the installation is completed, and it is displayed with the multi-language font 170 built-in in the operating system 140 (step 450). The audio data are loaded and played by the selection module 135 from the storage unit 100 in according to the language index files of each country when audio outputs are needed for the multi-language navigation system 180.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A navigation system with switchable multi-language operating interfaces, comprising:
    a storage unit for storing installation programs and audio databases of the multi-language operating interfaces;
    a Basic Input/Output System (BIOS) for actuating the navigation system during a boot up thereof and controlling to display a selection interface of settings;
    a setup module for receiving a user selection from the selection interface;
    an installation module for loading and installing the corresponding installation program of the multi-language operating interface from the storage unit in accordance with the user selection; and
    a memory module for storing the installed multi-language operating interfaces,
    wherein the navigation system is configured such that once the multi-language operating interfaces are installed, there is no need to make a language selection when being warm-booted so that a language is switchable to a desired language without re-cold-booting the navigation system.

2. The navigation system with switchable multi-language operating interfaces of claim 1, wherein the storage unit is a built-in micro-drive inside the navigation system.

3. The navigation system with switchable multi-language operating interfaces of claim 1, wherein the storage unit is a flash card connected to the navigation system through an expansion interface.

4. The navigation system with switchable multi-language operating interfaces of claim 3, wherein the expansion interface is selected from the group consisting of Secure Digital (SD), Multi-Media Card (MMC), Compact Flash (CF), and Memory Stick (MS).

5. The navigation system with switchable multi-language operating interfaces of claim 1, wherein the storage unit includes a system configuration file for guiding the BIOS to setup the navigation system.

6. The navigation system with switchable multi-language operating interfaces of claim 1, wherein the storage unit includes a system configuration file for specifying languages available for the installation programs of multi-language operating interface.

7. The navigation system with switchable multi-language operating interfaces of claim 1, wherein the memory module is a volatile memory.

8. The navigation system with switchable multi-language operating interfaces of claim 1, wherein the multi-language interface is using a font provided by an operating system of the navigation system.

9. The navigation system with switchable multi-language operating interfaces of claim 1, wherein the system further comprises a control module for receiving a switch interface language command to perform a hot-swap while the navigation system is operating.

10. The navigation system with switchable multi-language operating interfaces of claim 1, wherein the installation module includes a selection module for loading audio data from the audio database in accordance with a language of the user selection.

* * * * *